United States Patent [19]

Norgard

[11] 3,963,847

[45] June 15, 1976

[54] SURFACE TEXTURE FOR FIBROUS BOARDS

[75] Inventor: Fred C. Norgard, Somerville, N.J.

[73] Assignee: Johns-Manville Corporation, Denver, Colo.

[22] Filed: Dec. 23, 1974

[21] Appl. No.: 539,195

Related U.S. Application Data

[60] Division of Ser. No. 241,161, April 5, 1972, Pat. No. 3,870,540, which is a continuation-in-part of Ser. No. 49,325, June 24, 1970, abandoned.

[52] U.S. Cl. .............................. 428/147; 156/279; 162/152; 427/188; 427/198; 427/262; 428/159; 428/161; 428/172; 428/195; 428/206; 428/207; 428/290; 428/310; 428/327

[51] Int. Cl.$^2$ .............................. B32B 19/00

[58] Field of Search .......... 428/156, 195, 289, 161, 428/174, 310, 290, 147, 173, 206, 323, 159, 172, 207, 327; 427/188, 198, 262; 264/DIG. 7, 16, 17, 41, 44; 156/77, 279, 84; 162/115, 207

[56] References Cited

UNITED STATES PATENTS

| | | | |
|---|---|---|---|
| 1,513,620 | 10/1924 | MacIldowie | 428/323 |
| 1,898,601 | 2/1933 | Shoemaker | 428/156 |
| 2,302,020 | 11/1942 | Frederick | 162/115 |
| 2,838,416 | 6/1955 | Babiarz et al. | 428/206 |
| 2,996,389 | 8/1961 | Fernhof | 264/DIG. 7 |
| 3,176,054 | 3/1965 | Einstein et al. | 264/DIG. 7 |
| 3,634,562 | 1/1972 | Kole et al. | 264/41 |

*Primary Examiner*—William J. Van Balen
*Assistant Examiner*—Stanley S. Silverman
*Attorney, Agent, or Firm*—Robert M. Krone; Joseph J. Kelly; James W. McClain

[57] ABSTRACT

An aesthetically pleasing texture is imparted to wet-laid fibrous mats by distributing a layer of solid expanded particles of synthetic thermoplastic resinous foamed material on the upper surface of the mat. The particles are then pressed into the wet lap to embed the particles in the fibrous material and the wet lap is subsequently heated to reduce the volume of the particles and leave depressions in the surface which result in a unique random surface texture.

8 Claims, 4 Drawing Figures

30
28
26
24
22
20

16
12
14
18
10

12
14
18
10

10
12
14
3

SURFACE TEXTURE FOR FIBROUS BOARDS

This is a division of application Ser. No. 241,161, filed Apr. 5, 1972, now U.S. Pat. No. 3,870,540. Application Ser. No. 241,161 is a continuation-in-part of application Ser. No. 49,325, filed on June 24, 1970 now abandoned.

FIELD OF THE INVENTION

This invention relates to ornamental composition boards suitable for use as tiles and panels in ceilings and other walls of buildings, and to a method for making such boards. The invention is particularly applicable to fibrous composition boards made by processes involving the formation of a wet lap, as by wet-felting or water-laying of a fibrous mix from an aqueous slurry on a Four-drinier or cylinder machine or by other techniques for forming fibrous wet laps which may be dried to produce the composition boards. While the invention has utility with various types of fibrous composition boards, including wood and other cellulosic fiber boards well-known in the industry, it is exceptionally effective and will be chiefly described and illustrated in its application to mineral fiber boards and particularly mineral wool boards.

BACKGROUND OF THE INVENTION

Fibrous composition boards have been used for years in interior ceilings and other interior walls of buildings to provide exposed surfaces which are ornamental or decorative and which preferably also function to improve the acoustical properties of the walls. It has been a popular practice to form perforations, fissures, cavities, and other forms of openings of various types and shapes, on the surface of the board to be exposed to impart improved aesthetic and acoustical properties to the boards.

These openings typically have been formed by mechanically drilling, punching, piercing or die-forming the dry board stock produced by drying the wet lap. In some cases the surface of the dried board has been brushed or abraded or eroded by sandblasting to impart a roughened texture to portions of the visible surface in attempts to provide additional or different aesthetic effects. Before drying, however, the wet lap has very little strength. While some types of surface texturing and fissuring have been performed on the wet lap before drying it, as by dragging the surface of mineral fiber wet lap board stock with a screed or drag bar to form fissures in it, the type and amount of working of the surface prior to drying of the wet lap are limited by the lack of strength of the wet lap and by other properties and characteristics of the wet lap.

The walls or boundaries of the fissures or textural contours are usually more cleanly defined if they are produced in the surface of the board after it has been dried, rather than before, and because this clean definition has been favorably regarded, much emphasis has been placed on the techniques of treating the surface of the dry board. This procedure has some disadvantages, however, such as a tendency to weaken the board by severing or tearing the fiber network after the board has been dried or set. Thus, in spite of the keen competition and incentive in the trade to produce boards with new and superior aesthetic effects and with at least adequate acoustical and other properties, success has been limited. Only a relatively few basic practical techniques for surface treatment, to open or contour the surface of the boards, have been found feasible or commercially attractive, and this has limited the ornamental effects achieved.

In this situation, it has become increasingly desirable but difficult to achieve any strikingly different and pleasing departure from the old aesthetic concepts in these ornamental fibrous boards in which the ornamentation is provided chiefly by opening the surface of the board. It has been particularly difficult to find a commercially practicable process which provides a new aesthetic effect along with the acoustical and other utilitarian characteristics desired of such boards.

OBJECTS OF THE INVENTION

A primary object of the present invention is to provide a composition board of the general type discussed above but having a fresh and strikingly different and pleasing visual appeal.

A further object is to provide such a board having adequate or improved acoustical characteristics.

A further object is to provide such a board having adequate or improved properties of strength, fire-resistance, sag-resistance, and other utilitarian features.

Additional, objects and advantages of the invention will be set forth in part in the description which follows, and in part will be obvious from the description, or may be learned by practice of the invention.

SUMMARY OF THE INVENTION

The objects and advantages of the invention are achieved by producing unique and pleasing aesthetic effects on fibrous boards by distributing a layer of particles of a synthetic thermoplastic resinous foamed material on one surface of a water-laid lap of entangled fibers before pressing the lap, and then pressing the particles into the wet lap to embed the particles in the wet lap. Subsequently, the wet lap having the particles embedded in one surface is heated to reduce the effective volume of the particles and leave depressions in the surface which produce a unique surface texture.

The invention includes a fibrous board which has a decorative surface texture on one face comprising a water-laid compressed mat of entangled fibers containing surface craters. A portion of the surface area of the craters is coated with thermoplastic material. Fibrous areas are positioned between a substantial number of the craters, with the fibrous areas possessing a substantially rougher exterior surface than the walls of the crater which are formed by fibers that undergo intense compressive stress during the pressing operation.

DETAILED DESCRIPTION OF PREFERRED EMBODIMENTS OF THE INVENTION

Figures 1, 2, 3, 4:
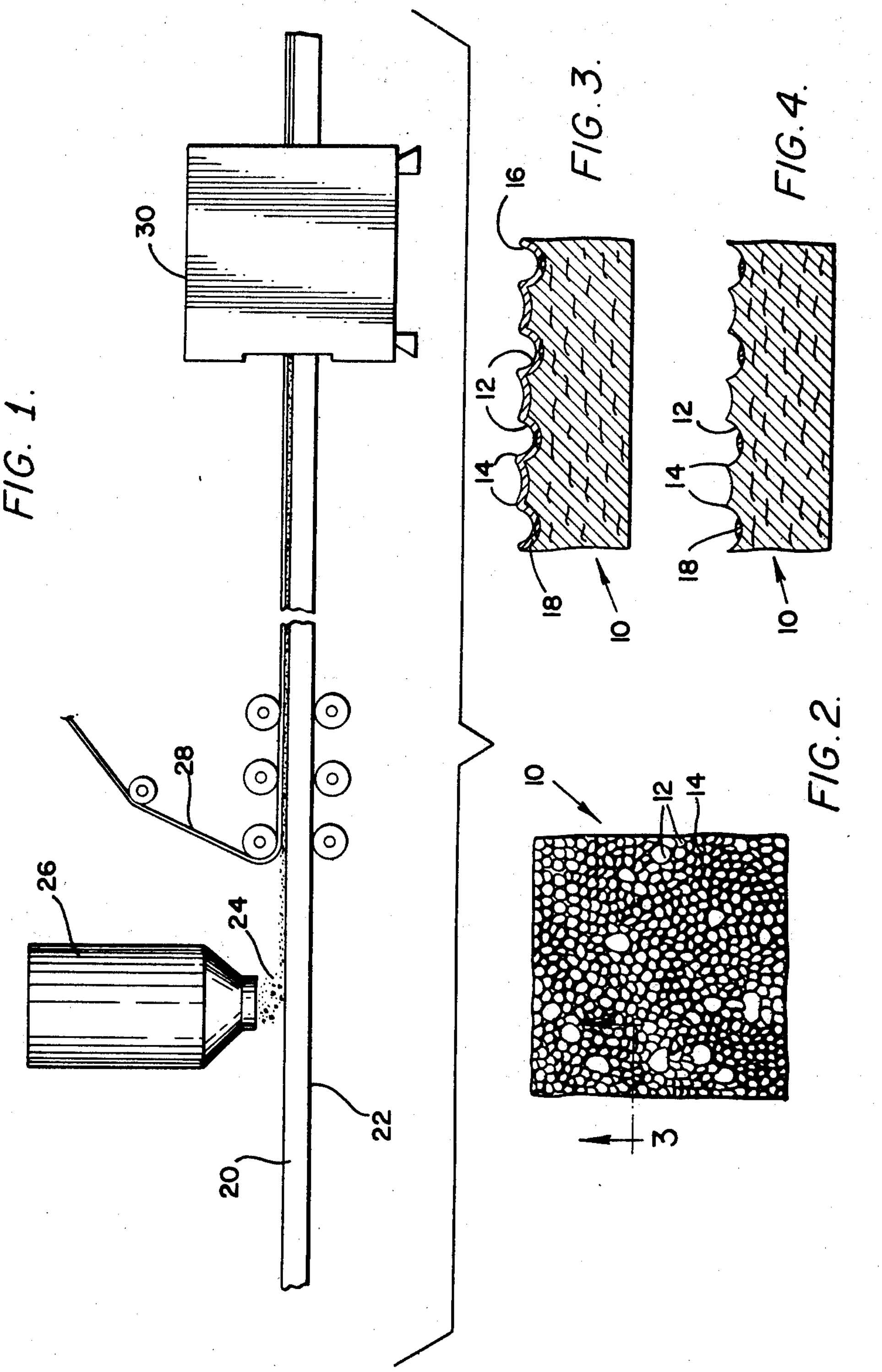
FIG. 1 is a schematic representation of a process and equipment for producing the novel, decorative board of the invention.
FIG. 2 is a plan view of the textured face of a portion of a decorative board of this invention.
FIG. 3 is an enlarged sectional elevation view of a portion of the board of FIG. 2 taken along line 3—3 of FIG. 2; and, FIG. 4 is an enlarged sectional elevation view of a portion of another board having the unique surface texture of this invention.

In accordance with the method of the invention, solid synthetic organic thermoplastic resinous foamed particles are deposited on the surface of a water-laid mat of entangled fibers, and are then embedded in the mat of fibers. Subsequently, the fibrous mat is heated to decrease the volume of the foamed particles and created depressions in the surface of the mat.

The solid foam particles which are deposited on the surface of the mat can be selected from a large variety of solid thermoplastic synthetic resinous foamed materials which contract in volume upon exposure to moderate heat. In preferred embodiments of the invention, the material in the finished board has less than 50% of its initial volume. Suitable solid particles include expanded or "foamed" particles of thermoplastic synthetic resinous material which, when melted, occupy a substantially reduced volume compared to their expanded condition. Preferably, the solid foam particles vary in size and have a largest dimension between about one-eighth and three fourths inches. However, the particles can be uniformly sized, or can be larger or smaller than the preferred size range.

The solid particles can comprise beads of any synthetic organic resinous thermoplastic material which can be expanded or foamed. Typical examples include polystyrene, polyethylene, polypropylene, poly(vinyl chloride), poly (methyl methacrylate) and nylon, as well as copolymers and blends thereof. Preferred are polystyrene, polypropylene, poly(vinyl chloride), and polyethylene, with polystyrene being most preferred because of its low cost, ready availability, and ease of handling. When these materials are heated, the thermoplastic material stays on the surface of the board but is greatly reduced in volume. It has been found that most synthetic organic thermoplastic resinous foam materials, when melted, tend to form small spherical particles at the bottom of the craters.

The solid particles can be distributed on the surface of the wet lap in any convenient manner. Preferably, a feeding apparatus is used that deposits a precise, predetermined quantity of solid particles across the cross section of wet lap. The use of an agitated solids feeding mechanism in which the flow of solids is regulated by a valve or gate structure forms a suitable distribution procedure.

To avoid excessive disruption, it is frequently desirable to form a layer of beads that is one bead thick on the surface of the wet lap. Also, for aesthetic reasons it is desirable to have a majority of the beads in the one-bead-thick (single) layer abut another bead or beads.

The solid particles are deposited on the surface of the wet lap before wet pressing and preferably before the solids content of the board reaches about 50%. A compressive force is applied across the thickness of the wet lap to embed the beads in the wet lap. The wet pressing step can be performed by a roll press such as used in pressing wet laps in Fourdrinier and cylinder machines.

Immediately after the pressing step, the surface of the wet lap which is to be textured tends to be substantially planar since the pressing operation embeds the solid particles into the fibrous mat.

After the solid foam particles have been embedded in the pressed wet lap, the wet lap is exposed to heat to reduce the volume of the foamed material and create void spaces in the surface of the board. In the heating step, the solid foam particles are heated at a temperature sufficient to cause them to decrease in volume. The particular temperture required will depend on the foamed material used, for the thermoplastic material must be raised to its melting point to achieve the reduction in volume.

The process of the invention does not disintegrate the wet lap or destroy its basic edge contours or dimensions, but it does strikingly alter the surface configuration of the wet lap. When rounded solid particles are distributed entirely across the surface of the board, a cratered appearance is provided that somewhat resembles the surface of the moon.

Typical surface textures provided by this invention are illustrated in FIGS. 2, 3, and 4. A mineral wool board, generally 10, is formed by a mat of entangled fibers. A plurality of randomly arranged craters 12 are distributed across the upper surface of board 10, with narrow bands of fibrous areas 14 positioned between a substantial number of craters. The fibrous areas possess a rougher exterior surface than the walls of craters 12, which heightens the dramatic visual effect of the textured surface. It is believed that this variation in surface texture and appearance between the crater walls and the narrow bands results from the differing amounts of compression which are applied across the face of the wet lap because of the presence of the thermoplastic beads on the surface during the wet pressing operation. The fibers forming the walls of the craters are subjected to more compression than the fibers positioned between the particles during the wet pressing operation.

In the embodiment of FIGS. 2 and 3, the surface of board 10 is coated with a paint layer 16, best illustrated in FIG. 3. A small volume of thermoplastic material is positioned in each crater as a result of melting the thermoplastic foamed beads. As illustrated in FIG. 3, the melted thermoplastic material comprises small globules 18 that are located at the bottom of the craters.

Over 75% of the surface area of the board comprises craters in the embodiment illustrated in FIGS. 2 and 3. The craters when viewed from above the surface of the board, are generally circular.

Paint layer 16, as illustrated in FIG. 3, covers globules 18 and masks the appearance of the globules. Paint layer 16 also tends to act as a binder and helps prevent globules 18 from being dislodged from board 10. It has been observed that even when sufficient paint is sprayed on board 10 to mask the appearance of globules 18, narrow bands 14 between the craters 12 retain a rougher surface texture and appearance than the walls of the crater.

The board of FIG. 4 has not been painted. Globules 18 are visually apparent when looking down at the bottom surface of the craters 12 of this board.

A specific example of the process of this invention will now be described with reference to FIG. 1. A mineral wool wet lap 20 is water laid from a fibrous aqueous slurry on the bottom screen 22 of Fourdrinier machine. The board is formed from a 3.5% solids slurry containing 70.25% mineral wool, 15.25% clay, 9% starch and 5% defibered No. 1 newsprint in percent by weight of solids in the slurry.

Before the wet lap is pressed, and while the solids content of the wet lap is about 25% by weight, foamed polystyrene beads 24 are deposited on the top surface of the wet lap from a dispensing hopper 26.

The expanded polystyrene beads have a density of about 2 pounds per cubic foot, and vary in size from one-eighth to three-eighths inch in diameter. The beads are distributed uniformly across the width of the moving wet lap to form a layer of abutting beads that is only one bead thick.

The foamed beads 24 are pressed into the top surface of the wet lap by a top screen 28 of the Fourdrinier press, which embeds the beads in the wet lap. The nip pressure exerted on the boards is within the standard 200–300 psi range commonly employed during wet pressing operations.

Subsequently, the wet lap having foamed beads 24 embedded on its top surface is passed through a drying oven 30 held at about 350°F which melts foamed beads 24 to cause a decrease in the volume of the beads and the formation of craters in the upper surface of the fibrous lap. Over 75% of the area of the surface comprises craters.

The dried board is sprayed with a white acrylic melamine primer and then an acrylic latex paint to form a board having a surface texture similar to that illustrated in FIGS. 2 and 3.

What I claim is:

1. A fibrous board having a decorative, randomly textured surface on one face comprising:

a water laid compressed mat of entangled fibers having one surface containing surface graders produced by a method comprising:

a. forming a water laid lap of entangled fibers;

b. substantially uniformly distributing a layer of discreet particles of a foamed synthetic organic thermoplastic resinous material on one surface of the water laid lap of entangled fibers such that most of the particles abut one another before pressing the wet lap;

c. pressing the particles into the wet lap to embed the particles in the wet lap; and d. heating the wet lap to reduce the volume of the foam material and leave said craters in the surface which produce a unique random surface texture;

with substantially all of said craters containing a small volume of said synthetic organic thermoplastic resinous material, and, said board containing in those areas where said particles did not abut, fibrous areas positioned between adjacent craters, the fibrous areas possessing a substantially rougher exterior surface than the walls of the craters.

2. The fibrous board of claim 1 in which over 75% of the area of said surface comprises craters.

3. The fibrous board of claim 1 in which the thermoplastic material is polystyrene.

4. The fibrous board of claim 3 in which the fibers are mineral wool fibers.

5. The fibrous board of claim 4 in which a majority of the craters have a largest dimension of between about one-eighth and three-fourths inch.

6. The fibrous board of claim 1 in which the volume of the thermoplastic material comprises less than 50% of the volume of the crater.

7. The fibrous board of claim 1 in which the thermoplastic material is generally spherical and is located at the bottom of each crater.

8. The fibrous board of claim 1 including a surface layer of paint that covers the thermoplastic material and helps bond the thermoplastic material to the board.

* * * * *